3,024,216
COMPOSITIONS OF PARTIALLY HYDROLYZED VINYL CHLORIDE-VINYL ACETATE COPOLYMERS AND POLYURETHANE RESINS, POLYETHYLENE COATED WITH SAME AND PROCESS FOR MAKING COATED ARTICLE
Gretchen Smitmans, Metuchen, and Walter K. Vollmer, North Plainfield, N.J., assignors to Union Carbide Corporation, a corporation of New York
No Drawing. Filed July 28, 1958, Ser. No. 751,146
21 Claims. (Cl. 260—45.5)

This invention relates to compositions comprising a partially hydrolyzed vinyl chloride-vinyl acetate copolymer and a polyurethane resin. More particularly, this invention relates to compositions comprising a partially hydrolyzed vinyl chloride-vinyl acetate copolymer and a polyurethane resin which are particularly suitable as barrier coatings for polyethylene, such as surfaces of polyethylene containers and other such packaging means.

Polyethylene containers, which are otherwise desirable because of their flexibility over a wide range of temperatures, their relatively light weight, and their chemical inertness toward aqueous and non-aqueous fluids, have not found wide use in the packaging of liquid cosmetics and liquid organic chemicals due to the permeability shown by polyethylene toward these liquids.

The permeability of polyethylene to liquid cosmetics such as perfumes which contain essential oils and flavor components, illustrative of which are citrus oils, clove oils, orange oils, lemon oils, eugenol, isoeugenol and inonones, and also the permeability to organic chemicals such as toluene, ethyl alcohol, and ethyl acetate has seriously limited the use of polyethylene containers as packaging means for such liquids.

It has been found that when perfumes or liquid organic chemicals are packaged in polyethylene containers, the more volatile components of these liquids pass through the walls of the containers. Consequently, the packages undergo a loss of weight. In addition, the packaged liquids undergo a basic change in character due to the escape of their more volatile components. The escape of liquids from the tightly capped containers results in a greater pressure acting on the exterior of the containers than on the interior walls thereof as air cannot readily pass into the containers to replace the escaped liquids. This pressure differential often results in the distortion or collapsing of the walls of the containers.

The problem of "permeability" of polyethylene has been attacked by various methods, none of which has resulted in an adequate solution. For example, it has been proposed to coat polyethylene surfaces with a variety of resinous coating compositions. Illustrative of one such composition is a copolymer of vinyl chloride and vinylidene chloride marketed under the trade name "Saran." "Saran" has the following physical properties: specific gravity 1.65 to 1.72, tensile strength 20,000 to 40,000 lbs./square inch, impact strength 0.3 to 1.0 ft.-lbs./notch inch, index of refraction 1.61, and dielectric strength 350 volts/mil.

"Saran" and other compositions which have been formulated and used as barrier coatings on polyethylene surfaces in order to improve the impermeability characteristics of polyethylene have not been found satisfactory in that they do not have good "barrier" action and, in addition, their adhesion to polyethylene surfaces is poor.

Polyethylene does not contain highly "polar" groups which could set up a strong electrostatic bond between the atoms of the coating composition and the polyethylene surfaces. Adhesion of resinous coating compositions to polyethylene surfaces depends upon mechanical factors, that is, the presence of rough, porous areas on the polyethylene surfaces into which the coatings can penetrate to form teeth or anchors. With coating or "barrier" compositions presently formulated, not only has the mechanical adhesion been weak but the coatings have not possessed an adequate degree of flexibility which would allow use of such compositions in coating surfaces of polyethylene "squeeze" bottles and flexible films.

It is an object of this invention, therefore, to provide a composition which is particularly suitable for use as a barrier coating on polyethylene surfaces.

It is a further object of this invention to provide compositions which, when applied as coatings, exhibit excellent adhesion toward polyethylene surfaces, possess and retain excellent flexibility characteristics and good adhesion qualities after prolonged contact with liquid organic chemicals and liquid cosmetics.

A further object of this invention is to provide polyethylene surfaces of improved impermeability.

The improved coating compositions of this invention comprise a mixture of a partially hydrolyzed vinyl chloride-vinyl acetate copolymer and a reactive polyurethane resin.

The compositions of this invention, comprising a mixture of partially hydrolyzed vinyl chloride-vinyl acetate copolymers and polyurethane resins when coated and cured on polyethylene surfaces provide coatings which substantially prevent passage of organic liquids through polyethylene without in any way affecting the otherwise desirable properties of polyethylene, such as flexibility, toughness, and inertness toward aqueous and non-aqueous fluids. In addition, the compositions of this invention, when applied as coatings, not only exhibit excellent adhesive properties toward polyethylene but also possess a high degree of flexibility. These compositions, therefore, are particularly desirable as coatings for flexible polyethylene "squeeze" bottles and for flexible polyethylene films. Furthermore, the coating compositions of this invention retain both their excellent adhesion and flexibility characteristics over a wide range of temperatures and also on prolonged contact with the liquid which is packaged.

The polyurethane resins which are mixed with the partially hydrolyzed vinyl chloride-vinyl acetate copolymers to form the compositions of this invention contain more than one

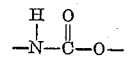

group per molecule and are capable of curing to an infusible, insoluble state by reaction through their reactive isocyanate groups with the hydroxy groups of the partially hydrolyzed vinyl chloride-vinyl acetate copolymers.

Polyurethane resins can be produced by a variety of methods as is well known by those skilled in the art. For example, a mixture containing an aromatic or aliphatic diisocyanate and a polyhydric compound can be reacted to produce polyurethane resins. As an illustration, a particularly desirable polyurethane resin is one obtained by reacting a mixture containing 2 moles of toluene diisocyanate per each mole of a polyalkylene glycol having an average molecular weight of about 400. Suitable polyurethane resins can be prepared by reacting a mixture of a diisocyanate and a polyhydric compound wherein the ratio of isocyanate groups to hydroxyl groups is from about 1.2 to about 3 isocyanate groups per each hydroxyl group.

Illustrative of one method for producing polyurethane resins, 650 grams of toluene diisocyanate were placed in a flask equipped with an agitator, a thermometer, and a dropping funnel. 750 grams of a polyethylene glycol having an average molecular weight of about 400 were added to the flask through the dropping funnel over a period of twenty minutes. The mixture was agitated and the reaction proceeded exothermally. The temperature in the flask reached a maximum of about 115° C. and then dropped to about 65 to 70° C. at the completion of the reaction. Once the temperature dropped to about 65–70° C., the reaction product was transferred to a sealed container. The product was a smooth, viscous, amber colored liquid having a viscosity of about 42,000 centipoises at 25° C. as determined by a standard Brookfield viscometer.

The polyurethane resin can also be prepared in the presence of an inert solvent. Thus, the diisocyanate and polyhydric compound can be dissolved in an inert solvent and allowed to react or each can be dissolved in inert mutually miscible solvents and the resultant solutions admixed and reacted.

Illustrative of suitable solvents can be mentioned aromatic hydrocarbons such as toluene and xylene; esters such as ethyl acetate; and chlorinated solvents such as ethylene dichloride. Solvents having active hydrogen atoms should be avoided since these solvents will react with the diisocyanate.

Both aliphatic and aromatic diisocyanates can be used to react with polyhydric compounds to produce polyurethane resins which are suitable for purposes of this invention. Illustrative of such diisocyanates are the following: hexamethylene diisocyanate, tolylene diisocyanate, diphenylmethane diisocyanate, 1,5-naphthylenediisocyanate, p-phenylene diisocyanate, m-phenylene diisocyanate, 4,4'-diisocyanate dibenzyl, naphthylene-1,5-diisocyanate, diphenylmethane-p-p'-diisocyanate, triphenylmethane-p,p'-diisocyanate, tetramethylene - diisocyanate, 4,4' - dicyclohexylmethane-diisocyanate, 1-methyl benzene-2,4,6-triisocyanate, tolylene-2,4 - diisocyanate, 1-chloro - phenylene-2,4-diisocyanate, xenylene-4,4'-diisocyanate, cyclohexylene-1,2-diisocyanate, cyclohexylene-1,4-diisocyanate, 4,4'-diphenyl diisocyanate, 3,5-tolyl diisocyanate, 2,4-tolylene diisocyanate, 3,3'- dimethyl 4,4'-biphenylene diisocyanate, 3,3'-dimethoxy 4,4'-biphenylene diisocyanate, 4,4'-methylene di-o-tolyl diisocyanate.

Generally, liquid polyhydric compounds are used to react with the diisocyanates to produce the polyurethane resins. Of the many polyhydric compounds, the polyalkylene glycols are preferred. Suitable polyalkylene glycols may be represented by the formula $HO(RO)_nH$ in which R stands for an alkylene radical, such as methylene, ethylene, propylene and so forth and $n$ is an integer greater than one. Not all of the alkylene radicals present need to be the same. Polyalkylene glycols containing a mixture of radicals, as in the compound $$HO(CH_2OC_2H_4O)_nH$$

can be used wherein $n$ has a value of at least one.

Particularly preferred polyalkylene glycols are the commercially available products marketed under the name "Carbowax," Polyalkylene Glycols, such as polyethylene glycol and polypropylene glycol, which have an average molecular weight of from about 300 to about 750.

If desired, mixtures of polypropylene glycols and/or mixtures of polyethylene glycols can be admixed and reacted with the diisocyanates to produce suitable polyurethane resins. Such mixtures are sometimes advantageous in that the properties of the polyurethane resin can be conveniently varied and balanced as desired.

The partially hydrolyzed vinyl chloride-vinyl acetate copolymers which are used in combination with the polyurethane resins to produce the coating compositions of this invention are ones wherein the degree of hydrolysis is such that the copolymer contains by weight, from about 70 to about 96.5 percent vinyl chloride; from about 2 to about 20 percent vinyl alcohol, and from about 1.5 to about 25 percent vinyl acetate, combined therein.

A particularly preferred partially hydrolyzed vinyl chloride-vinyl acetate copolymer is one wherein there is present about 91 percent by weight vinyl chloride, about 3 percent by weight vinyl acetate, and about 6 percent by weight of vinyl alcohol, combined in the copolymer.

For a more detailed explanation of the partially hydrolyzed vinyl chloride-vinyl acetate copolymers suitable for combining with polyurethane resins reference is made to United States Patent No. 2,512,726 to George R. Penn, Jr. et al. issued June 27, 1950, which is herewith incorporated by reference.

Generally, it has been found that the ratios of partially hydrolyzed vinyl chloride-vinyl acetate copolymer to polyurethane resin should be from about 0.3 to about 2 parts by weight of partially hydrolyzed vinyl chloride copolymer to one part by weight of polyurethane. For best "barrier" action and adhesion to the polyethylene surfaces, the ratio of vinyl chloride copolymer is preferably from about 0.4 to about 2 parts by weight per each part by weight of polyurethane resin.

The significant relationship of the ratio of the partially hydrolyzed vinyl chloride-vinyl acetate copolymer to polyurethane resin as it applies to the formulation of a suitable composition for purpose of this invention is indicated in Table I below wherein the partially hydrolyzed vinyl chloride-vinyl acetate copolymer had the following composition: vinyl chloride, 91 percent by weight; vinyl acetate, 3 percent by weight; and vinyl alcohol, 6 percent by weight. The polyurethane resin was the reaction product of one mole of polyethylene glycol having an average molecular weight of about 400 and about 2 moles of toluene diisocyanate.

The ratio of partially hydrolyzed vinyl chloride-vinyl acetate copolymer to polyurethane is in parts by weight.

TABLE I

*Composition of partially hydrolyzed vinyl chloride-vinyl acetate copolymer and polyurethane resin*

| Vinyl chloride copolymer | Polyurethane, parts | Adhesion | Flexibility |
|---|---|---|---|
| 0.25 parts | 1 | Excellent | Too stiff. |
| 0.30 parts | 1 | do | Good. |
| 0.4 parts | 1 | do | Do. |
| 0.5 parts | 1 | do | Do. |
| 1 part | 1 | do | Do. |
| 2 parts | 1 | do | Do. |
| 2.5 parts | 1 | Poor | Do. |

The adhesive qualities and flexibility characteristics of the compositions noted in Table I were determined by coating specimens of low density, i.e., 0.91 to 0.93, polyethylene film whose surfaces had been treated with a potassium dichromate solution in sulfuric acid, commonly referred to as a "chromic acid" treatment. The "chromic acid" treatment is described in United States Patent No. 2,668,134 to P. V. Horton issued February 2, 1954 which is herewith incorporated by reference. Each specimen had the following dimensions, 6 inches in length, 2 inches in width and 3 mils in thickness.

The compositions were dissolved in a convenient amount of a 50–50 mixture in parts by weight of methyl isobutyl ketone and toluene to form a solution having a solids content of about 15 percent by weight. A small amount of coating solution was placed onto each specimen and spread uniformly by "drawing" down with Bird Applicator to provide a uniform coating. The coated films, dried at about 65° C. had a coating on their surfaces of 0.5 mil thick. Each coated film specimen was then immersed in ethyl alcohol (95%) for 24 hours.

The coatings on each specimen were evaluated for

"adhesive" qualities using a test generally referred to as the "Scotch tape test." In this test Scotch tape is applied to the dried, coated surface, smoothed on with the fingers, and then given a quick vertical pull whereby the tape is stripped off rapidly. If the coating remains intact on the surface, the adhesion is rated as excellent. If the coating is stripped off by the tape, the adhesion is rated as poor.

The flexibility characteristics of the coating compositions were tested by bending and flexing the coated film to determine qualitatively the effect of the coating on the stiffness of the film and to check the coating for any tendency to flake and crack off the film.

The coating compositions of this invention are generally formulated by first dissolving the partially hydrolyzed vinyl chloride-vinyl acetate copolymer in a solvent which is also a solvent for the polyurethane resin. The amount of solvent used initially to dissolve the partially hydrolyzed vinyl chloride-vinyl acetate copolymer is such that the resultant solution has a solids content of about 20 percent by weight. The solution is then added to the polyurethane resin and the mixture thoroughly stirred. Once the polyurethane resin is dispersed in the solution, more solvent is added to produce a final mixture containing a total solids content of about 15 percent by weight. It is to be understood, however, that the actual solids content of the mixture will depend upon the type of application technique used to apply the coating solution.

A wide variety of solvents can be used in formulating the coating solutions. Illustrative of one such solvent is a 50–50 mixture in parts by weight of methyl isobutyl ketone and toluene. Other aliphatic and aromatic hydrocarbons and mixtures thereof which are commonly used are the following: methylethyl ketone, xylene, methylamyl ketone, butanol, methyl n-amyl ketone, mineral spirits, amyl alcohol, heptanone-2,4 methylpentanone-2 butanol, butyl acetate, and the like. The actual choice of solvent depends upon the coating technique which is to be used. For example, as will be recognized by those skilled in the art, higher boiling solvents are desirable when the coating composition is to be applied by spraying than when the coating composition is to be applied by slush coating.

The compositions of this invention can be applied as coatings by techniques such as spraying, slushing, immersing, roller coating and various other methods employed in the coating art. It is to be recognized that the compositions of this invention can be used to coat both the interior and/or exterior of bottles, tubes, pipes, film and polyethylene coated or impregnated articles, such as polyethylene coated paper stocks.

It is likewise not critical that the preformed polyethylene article or polyethylene surface be of any particular thickness as long as it is capable of being coated with the compositions of the present invention.

The density or type of polyethylene is also not critical. Both low density, i.e., from about 0.91 to about 0.93, and high density, i.e., from about 0.93 to about 0.98, polyethylene can be coated to improve the impermeability characteristics thereof. In addition, articles coated or impregnated with wax-like polyethylene, i.e., polyethylene having a molecular weight as low as 1500 (determined by a solution viscosity average molecular weight method described in Kemp and Peters, Industrial and Engineering Chemistry, volume 34, page 1097, also volume 35, page 1108), can also be coated with the compositions of this invention to achieve the desirable results previously discussed.

Coatings as thin as about 0.1 mil provide complete "barrier" action on polyethylene surfaces. Heavier coatings can, of course, be applied as desired either by a single coating treatment or by a plurality of coating treatments. For all practical purposes, a coating of about 0.3 to about 0.5 mil in thickness effects a complete "barrier" action for all types of polyethylene surfaces.

The coating compositions of this invention are capable of hardening to infusible, insoluble products at room temperature (about 23° C.). It is preferred, however, to heat the compositions by generally placing the coated article in an oven maintained at a temperature on the order of 140° F. to about 200° F. to effect a faster cure.

The actual curing temperature and time of exposure to such temperature depends upon the coating composition, the thickness of the applied coating, the type of solvent employed in formulating the coating composition solutions and the particular type of polyethylene coated.

The coating compositions of this invention can be applied directly to any polyethylene surface. To insure good adhesion, it is customary to treat the polyethylene surface with either well-known chemical or electrical means. These methods include the use of an oxidizing flame, electrostatic corona discharge, and also chemical oxidizing agents, such as a potassium dichromate solution in sulfuric acid known as the "chromic acid" treatment.

To indicate further the effectiveness of the compositions of this invention as barrier coatings for polyethylene surfaces, four-ounce Boston round polyethylene bottles having an average wall thickness of approximately 40 mils and equipped with aluminum-lined phenolic caps were coated with the compositions of this invention and filled with various liquids. The coatings were tested for (1) barrier action as indicated by the weight loss of the filled bottle after storage, (2) adhesion by cutting the bottles in two and subjecting the coated surfaces to the "Scotch Tape" test, (3) flexibility by bending and flexing each bottle half to determine qualitatively the effect of the coating on the stiffness of the bottle and to check the coating for any tendency to flake and crack off.

The bottles, before being coated, were "chromic acid" treated, washed and thoroughly dried.

Coating the bottles was accomplished by a "slush" coating method by completely filling the bottles with a solution of the compositions of this invention containing 15 percent by weight solids. The bottles were then inverted and allowed to drain until the drops of the coating solution fell at the rate of about one drop every ten seconds. The bottles were then rolled on their sides and the solvent vapors removed through a suction tube inserted about ¾ of the way inside the bottle. After about 20 minutes of drying in this fashion, the suction tube was removed and the bottles oven dried at a temperature of from about 140° F. to about 200° F. The actual time of exposure depends upon the actual coating composition, the thickness of the applied coating, the solvent, and the type of polyethylene.

Coatings applied by the above-described method are on the order of about 0.5 mils thick.

The efficiency of the compositions as barrier coatings was evaluated by filling the coated bottles with 120 cc. of various liquids as hereinafter specified, and noting the weight loss versus storage time. The bottles used in the "controls" were not coated unless otherwise stated.

The following liquids were used as the test liquids:

A. Lemon oil
B. Ethyl alcohol (95 percent)
C. Old Spice after-shave lotion
D. Light mineral oil
E. Water
F. Petroleum ether The following examples, which are illustrative and are not intended to limit the scope of this invention in any manner, clearly show the excellent adhesion, flexibility, and barrier action of the compositions of this invention.

EXAMPLE I (a) Polyurethane resin: 400 parts (1.0 mol) of polyethylene glycol (molecular weight about 400) was added dropwise to 348 parts (2.0 mols) toluene diisocyanate at room temperature with constant stirring. The reaction temperature gradually rose and reached a maximum of approximately 115° C. The reacted product was allowed to gradually cool to 65–70° C. At this point, the reacted product was transferred to a sealed container. The product, the polyurethane resin, was a smooth, viscous, amber-colored liquid having a viscosity of about 42,800 centipoises at 25° C.

(b) A partially hydrolyzed vinyl chloride-vinyl acetate copolymer having an approximate composition in percent by weight: combined vinyl chloride, about 91 percent; combined vinyl acetate, about 3 percent; combined vinyl alcohol, about 6 percent, was dissolved in a 50–50 mixture in parts by weight of methyl isobutyl ketone and toluene to make a solution having a solids content of 20 percent by weight.

To one part by weight of the polyurethane was added 0.5 parts by weight of the partially hydrolyzed vinyl chloride-vinyl acetate resin in the form of a 20 percent solution as previously described. The mixture was reduced to a solids content of 15 percent by weight with the addition of a 50–50 mixture in parts by weight of methyl isobutyl ketone and toluene.

Two four-ounce Boston round, low density polyethylene bottles having a wall thickness of about 40 mils and previously treated with a solution of potassium dichromate solution in sulfuric acid were slush coated in a manner previously described in the specification with the coating composition solution. The coated bottles were then oven heated at 180° F. for one hour. One bottle was filled with distilled water; the other with ethyl alcohol (95 percent). The bottles were capped and stored for 24 hours at 70° F. and at a relative humidity of 50 percent. At the end of twenty-four hours, the bottles were drained of their liquid contents and cut apart. The flexibility of each bottle was good. The adhesion of the coating to each bottle was excellent.

EXAMPLE II

Two four-ounce Boston round, low density polyethylene bottles were treated and coated and tested as described in Example I with the exception that the ratio of the partially hydrolyzed vinyl chloride-vinyl acetate resin to polyurethane resin was 1 to 1. One bottle was filled with water, the other with ethyl alcohol. The flexibility of each bottle remained good and the adhesion of the coatings was excellent.

EXAMPLE III

Five four-ounce Boston round, low density polyethylene bottles were treated and coated in a manner described in Example I and also with the same coating composition solution described in Example I with the exception that the coated bottles were heated for two hours in a vacuum oven at 170° F. These five bottles, together with five uncoated bottles were filled with lemon oil, tightly capped and stored for 30 days at 70° F., 50 percent relative humidity. The average loss of lemon oil by permeation through the coated bottles for the 30-day period was 1.11 percent. The average loss through the uncoated bottles was 16.72 percent. In addition to the high loss through the uncoated bottles, the shapes of the uncoated bottles had become severely distorted. The shape of the coated bottles was not affected.

EXAMPLE IV

The procedure of Example III was repeated with five coated and five uncoated bottles with the exception that the bottles were stored at 140° F. Average weight loss through the coated bottles in 25 days was 30.65 percent as compared to an average weight loss in just 7 days of 84 percent for the uncoated bottles.

EXAMPLE V

Five four-ounce Boston round, low density polyethylene bottles were treated and coated in a manner described in Example I and also with the coating composition solution described in Example I. These five coated bottles, together with five uncoated bottles, were filled with ethyl alcohol (95 percent) and stored for 30 days at 70° F., 50 percent relative humidity. Average weight loss from the coated bottles was 0.08 percent, from the uncoated bottles 0.17 percent.

EXAMPLE VI

Five four-ounce Boston round, low density polyethylene bottles were treated and coated in a manner described in Example I and also with the coating composition solution described in Example I. The five coated bottles and five uncoated bottles were filled with petroleum ether, tightly capped, and stored at 70° F., 50 percent relative humidity. In 75 days the average weight loss of the coated bottles was 32.7 percent. The uncoated bottles were entirely empty.

EXAMPLE VII

Five four-ounce Boston round, low density polyethylene bottles were treated and coated as described in Example I and also with the coating composition solution described in Example I. The five coated bottles and five uncoated bottles were filled with lemon oil, tightly capped, and stored at 120° F. The average weight loss through the coated bottles after 30 days was 0.7 percent; through the uncoated bottles the average weight loss was 65 percent.

EXAMPLE VIII

Five four-ounce Boston round low density polyethylene bottles were treated and coated in a manner described in Example I and with the coating composition of Example I. The five coated bottles and five uncoated bottles were filled with a light mineral oil, tightly capped and stored at 120° F. for 30 days. The average weight loss of the coated bottles was 1.1 percent; of the uncoated bottles 51.2 percent.

EXAMPLE IX

The procedure of Example I was followed except that the coated bottles were heated in a vacuum oven. The coated and uncoated bottles were filled with water and stored at 120° F. At the end of 5 days, the weight loss from the coated bottles was 0.29 percent, while the controls lost 0.38 percent. The adhesion of the coatings was excellent.

EXAMPLE X

Five four-ounce Boston round high density polyethylene bottles were treated and coated in a manner described in Example I and with coating solution described in Example I with the exception that the coated bottles were heated for four hours at 140° F. The five coated bottles and five uncoated bottles were filled with lemon oil, tightly capped, and stored at 120° F. At the end of five days, the coated bottles had an average weight loss of 0.57 percent, while the uncoated bottles had an average weight loss of 7.4 percent.

The adhesion of the coatings was excellent.

EXAMPLE XI

Five four-ounce Boston round high density polyethylene bottles were treated and coated in a manner described in Example IX and with the coating solution described in Example I. The five coated bottles and five uncoated bottles were filled with Old Spice after-shave lotion, tightly capped, and stored at 120° F. At the end of five days the coated bottles had an average weight loss of 0.56 percent, while the uncoated bottles had an average weight loss of 0.69 percent.

The adhesion of the coatings was excellent.

The compositions of this invention were compared to conventional coating compositions on the basis of the "barrier" action afforded. Bottles were treated and coated with compositions noted in Table II according to the process described in Example I. The coating compositions were also prepared according to the process described in Example I.

TABLE II

| Test liquid | Storage temperature, °F. | Relative humidity, percent | Control, no coating | "Saran" | Polyurethane resin, vinyl chloride vinyl acetate copolymer composition |
|---|---|---|---|---|---|
| Lemon oil | 70 | 50 | 16.7% weight loss (stored 30 days). | 1.4% weight loss (stored 5 days). | 1.1% weight loss (stored 30 days). |
| Ethyl alcohol (95%) | 70 | 50 | 0.17% weight loss (stored 30 days). | 0.22% weight loss (stored 30 days). | 0.08% weight loss (stored 30 days). |
| Petroleum ether | 70 | 50 | 100% weight loss (stored 28 days). | 65.4 weight loss (stored 28 days). | 32.7% weight loss (stored 30 days). |

The compositions of this invention are particularly desirable for use as coatings for polyethylene surfaces as heretofore described. In addition, however, these compositions might be useful as coatings on other thermoplastics, such as polypropylene. The compositions of this invention might also be useful as coatings for metals, glass and synthetic textiles, such as nylon, glass fabrics and the like.

What is claimed is:

1. A polyethylene surface coated with the cured product of a composition comprising a partially hydrolyzed vinyl chloride-vinyl acetate copolymer and a liquid polyurethane resin wherein the said copolymer is present in an amount from about 0.3 to about 2 parts by weight for each part by weight polyurethane resin and wherein said polyurethane resin is the reaction product obtained by reacting a mixture containing a diisocyanate and a polyalkylene glycol in amounts such that the ratio of isocyanate groups to hydroxyl groups is from about 1.2 to about 3 to 1.

2. A polyethylene surface coated with the cured product of the composition of claim 1 wherein the partially hydrolyzed vinyl chloride-vinyl acetate copolymer comprises by weight from about 70 to about 96.5 percent combined vinyl chloride, from about 2 to about 20 percent combined vinyl alcohol and from about 1.5 to about 25 percent combined vinyl acetate.

3. A polyethylene surface coated with the cured product of the composition of claim 1 wherein the polyalkylene glycol is polyethylene glycol having an average molecular weight of about 400.

4. A polyethylene surface coated with the cured product of the composition of claim 1 wherein the diisocyanate is toluene diisocyanate.

5. A polyethylene surface coated with the cured product of the composition of claim 1 wherein the coating on said surface is at least about 0.1 mil thick.

6. A curable composition comprising a liquid polyurethane resin and a partially hydrolyzed vinyl chloride-vinyl acetate copolymer in an amount from about 0.3 to about 2 parts by weight for each part by weight polyurethane resin said polyurethane resin being the reaction product obtained by reacting a mixture containing a diisocyanate and a polyalkylene glycol in amounts such that the ratio of isocyanate groups to hydroxyl groups is from about 1.2 to about 3 to 1.

7. A curable composition of claim 6 wherein the polyalkylene glycol is polyethylene glycol having an average molecular weight of about 400.

8. A curable composition of claim 6 wherein the diisocyanate is toluene diisocyanate.

9. A curable composition of claim 6 wherein the partially hydrolyzed vinyl chloride-vinyl acetate copolymer comprises in percent by weight from about 70 to about 96.5 percent combined vinyl chloride, from about 2 to about 30 percent combined vinyl alcohol, and from about 1.5 to about 25 percent combined vinyl acetate.

10. A polyethylene surface coated with the cured produce of the composition of claim 1 wherein the partially hydrolyzed vinyl chloride-vinyl acetate copolymer comprises by weight about 91 percent combined vinyl chloride, about 3 percent combined vinyl acetate and about 6 percent combined vinyl alcohol.

11. A polyethylene surface coated with the cured product of a composition comprising a partially hydrolyzed vinyl chloride-vinyl acetate copolymer wherein said copolymer contains by weight from about 70 to about 96.5 percent combined vinyl chloride, from about 2 to about 20 percent combined vinyl alcohol and from about 1.5 to about 25 percent combined vinyl acetate, and a liquid polyurethane resin which is the reaction product of a mixture containing a diisocyanate and a polyalkylene glycol which has an average molecular weight of about 300 to about 750 in amounts such that the ratio of isocyanate groups to hydroxyl groups is from about 1.2 to about 3 to 1; the said hydrolyzed vinyl chloride-vinyl acetate copolymer being present in said composition in an amount of from about 0.4 to about 2 parts by weight for each part by weight of said polyurethane resin.

12. The cured product of the composition of claim 6.

13. A curable composition of claim 6 wherein the partially hydrolized vinyl chloride-vinyl acetate copolymer comprises in percent by weight about 91 percent combined vinyl chloride, about 3 percent combined vinyl acetate and about 6 percent combined vinyl alcohol.

14. The cured product of the composition of claim 13.

15. A curable composition comprising a partially hydrolyzed vinyl chloride-vinyl acetate copolymer wherein said copolymer contains by weight from about 70 to about 96.5 percent combined vinyl chloride, from about 2 to about 20 percent combined vinyl alcohol and from about 1.5 to about 25 percent combined vinyl acetate, and a liquid polyurethane resin which is the reaction product of a mixture containing a diisocyanate and a polyalkylene glycol which has an average molecular weight of about 300 to about 750 in amounts such that the ratio of isocyanate groups to hydroxyl groups is from about 1.2 to about 3 to 1, said partially hydrolyzed vinyl chloride-vinyl acetate copolymer being present in said composition in an amount of from about 0.4 to about 2 parts by weight for each part by weight of said polyurethane resin.

16. The cured product of the composition of claim 15.

17. A curable composition of claim 15 wherein the liquid polyurethane resin is the reaction product of 2 moles of toluene diisocyanate per mole of polyethylene glycol having a molecular weight of about 400.

18. The cured product of the composition of claim 17.

19. The cured product of the composition of claim 7.

20. The cured prdouct of the composition of claim 8.

21. Process for improving the impermeability characteristics of polyethylene which comprises coating said polyethylene with a composition comprising a partially hydrolyzed vinyl chloride-vinyl acetate copolymer wherein said copolymer contains by weight from about 70 to about 96.5 percent combined vinyl chloride, from about 2 to about 20 percent by weight combined vinyl alcohol and from about 1.5 to about 25 percent combined vinyl acetate, and a liquid polyurethane resin which is the reaction product of a mixture containing a diisocyanate and a polyalkylene glycol in amounts such that the ratio of the isocyanate groups to hydroxyl groups is from about 1.2 to about 3 to 1, said partially hydrolyzed vinyl chloride-vinyl acetate copolymer being present in said composition in an amount of from about 0.3 to about 2 parts by weight for each part by weight polyurethane resin and curing said composition to an infusible product.

References Cited in the file of this patent

UNITED STATES PATENTS

| | | |
|---|---|---|
| 2,512,726 | Penn | June 27, 1950 |
| 2,606,162 | Coffey et al. | Aug. 5, 1952 |
| 2,891,876 | Brown et al. | June 23, 1959 |
| 2,948,691 | Windemuth et al. | Aug. 9, 1960 |